(12) United States Patent
Mui et al.

(10) Patent No.: US 9,742,942 B2
(45) Date of Patent: Aug. 22, 2017

(54) IMAGING DEVICE ASSEMBLY (75) Inventors: Paul K. Mui, Boise, ID (US); Eric L. Andersen, Meridian, ID (US); Jennifer L. Clark, Boise, ID (US); Scott A. Putz, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 737 days.

(21) Appl. No.: 13/100,741

(22) Filed: May 4, 2011

(65) Prior Publication Data
US 2012/0281257 A1  Nov. 8, 2012

(51) Int. Cl.
*H04N 1/00* (2006.01)
*E05B 59/00* (2006.01)
*E05B 61/00* (2006.01)
*E05B 63/00* (2006.01)

(52) U.S. Cl.
CPC ..... *H04N 1/00557* (2013.01); *H04N 1/00559* (2013.01); *Y10T 29/49826* (2015.01)

(58) Field of Classification Search
None
See application file for complete search history.

(56) References Cited

U.S. PATENT DOCUMENTS

| 5,162,845 A  * | 11/1992 | Ariyama et al. ............... 399/13 |
| 5,738,454 A    | 4/1998  | Zepeda et al. |
| 5,760,818 A    | 6/1998  | Hinton et al. |
| 7,008,031 B2 * | 3/2006  | Doerflinger et al. ......... 312/352 |
| 7,315,709 B2 * | 1/2008  | Kim et al. .................... 399/110 |
| 7,621,619 B2   | 11/2009 | Sakakitani |
| 7,720,430 B2 * | 5/2010  | Hasegawa et al. ........... 399/397 |
| 7,873,303 B2   | 1/2011  | Ohta et al. |
| 7,957,667 B2 * | 6/2011  | Otsuka et al. ................ 399/107 |
| 2003/0206310 A1| 11/2003 | Ferlitsch |
| 2006/0099004 A1*| 5/2006 | Hasegawa et al. ............. 399/92 |
| 2008/0049271 A1| 2/2008  | Carlson et al. |

* cited by examiner

*Primary Examiner* — John Wallace
*Assistant Examiner* — Darryl V Dottin
(74) *Attorney, Agent, or Firm* — Dicke, Billig & Czaja, PLLC (57) ABSTRACT

An imaging device assembly that includes a first imaging module frame, a second imaging module frame, and at least one first attachment member including a base positioned within an interior of the first imaging module frame and at least one protrusion extending from the base through a first wall portion of the first imaging module frame to be exposed external to the first imaging module frame, wherein the at least one protrusion is releasably connected to a top portion of the second imaging module frame.

18 Claims, 6 Drawing Sheets

IMAGING DEVICE ASSEMBLY

BACKGROUND

Conventional imaging devices include printers, scanners, copiers, or facsimile machines, as well as various combinations of these devices. In one example, a multifunction or all-in-one device includes at least a printer module, a scanner module, and a copier module with some components contributing to the functions of more than one of the respective modules. While in some instances, such all-in-one devices incorporate several imaging functions within a single container, in other instances, the all-in-one devices provides several imaging functions by physically attaching different containers together with each container providing functions generally independent of the other containers. In these latter arrangements, it is quite common for time-consuming manipulations to be used during the assembly process in order to physically attach the different containers together. Moreover, while such conventional arrangements have attachment mechanisms with adequate strength, the rigorous manner in which some consumers handle these all-in-one devices bodes for more robust attachment mechanisms between the different containers.

DETAILED DESCRIPTION

In the following detailed description, reference is made to the accompanying drawings which form a part hereof, and in which is shown by way of illustration specific embodiments of the present disclosure which may be practiced. In this regard, directional terminology, such as "top," "bottom," "front," "back," "leading," "trailing," etc., is used with reference to the orientation of the Figure(s) being described. Because components of embodiments of the present disclosure can be positioned in a number of different orientations, the directional terminology is used for purposes of illustration and is in no way limiting. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

Embodiments of the present disclosure are directed to an imaging device assembly in which two imaging modules are securely fastened to one another. In one embodiment, a first imaging module is positioned vertically above a second imaging module and a first attachment member includes a base portion located within an interior of the first imaging module. However, flanges of the first attachment member extend through a bottom portion of the first imaging module to protrude outwardly and releasably interlock with a second attachment member located at a top portion of the second imaging module. In this way, the bottom portion of the first imaging module becomes sandwiched between the base portion of the first attachment member and the second attachment member. With this arrangement, the first imaging module becomes secured relative to second imaging module while significantly strengthening the bottom portion of first imaging module in the assembled imaging device.

These embodiments, and additional embodiments, are illustrated and described in association with FIGS. 1-10.

Figure 1:
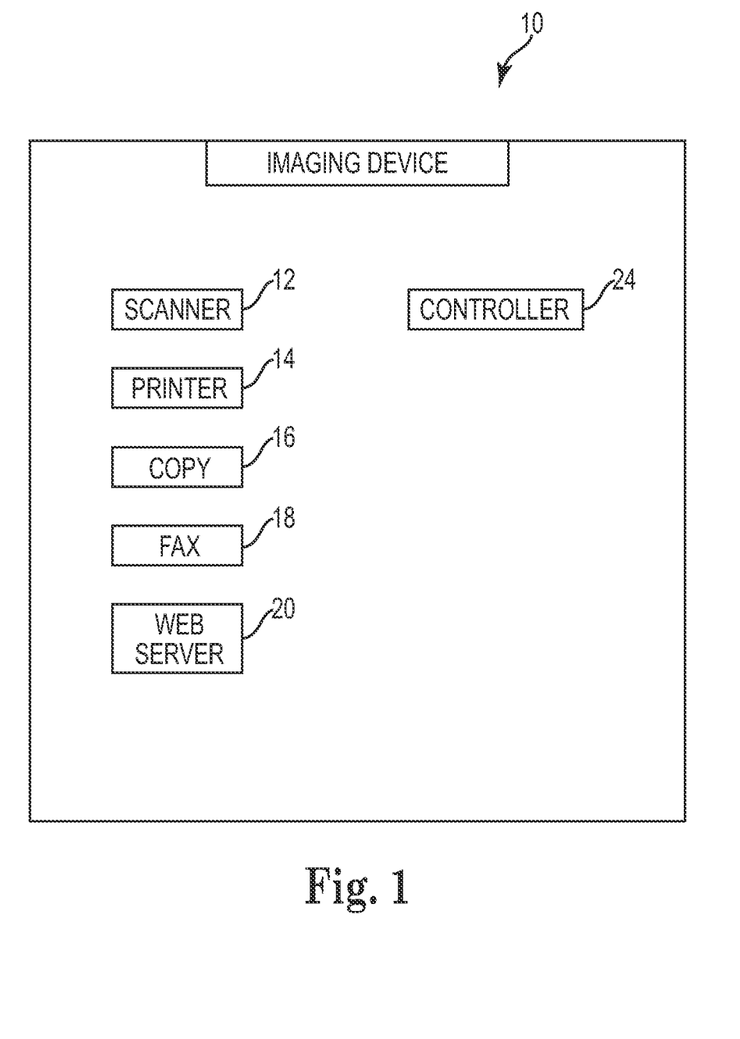
FIG. 1 is a block diagram schematically illustrating an imaging device assembly, according to an embodiment of the present disclosure.

An imaging device 10 is schematically illustrated in FIG. 1, according to an embodiment of the present disclosure. As shown in FIG. 1, in one embodiment, imaging device 10 comprises an assembly of two or more imaging modules such as, a scanner 12, a printer 14, a copier 16, and a facsimile module 18. One configuration of such an imaging device is a multifunction printer or an all-in-one device, in which multiple imaging modules are physically attached to each other. In some instances, the respective multiple modules are vertically stacked on top each other.

In one example, an imaging device 10 includes a scanner 12 and a printer 14 without a copier module 16 or a fax module 18 while in another example, the imaging device 10 includes a printer 14 and a copier 16 without a scanner 12 or fax module 18. It will be understood that the present disclosure is not strictly limited to the specific assemblies noted above, as different combinations of the imaging modules can form an assembly of the imaging device 10. In some embodiments, imaging device 10 further includes a web server 20 and a controller 24.

Figure 2:
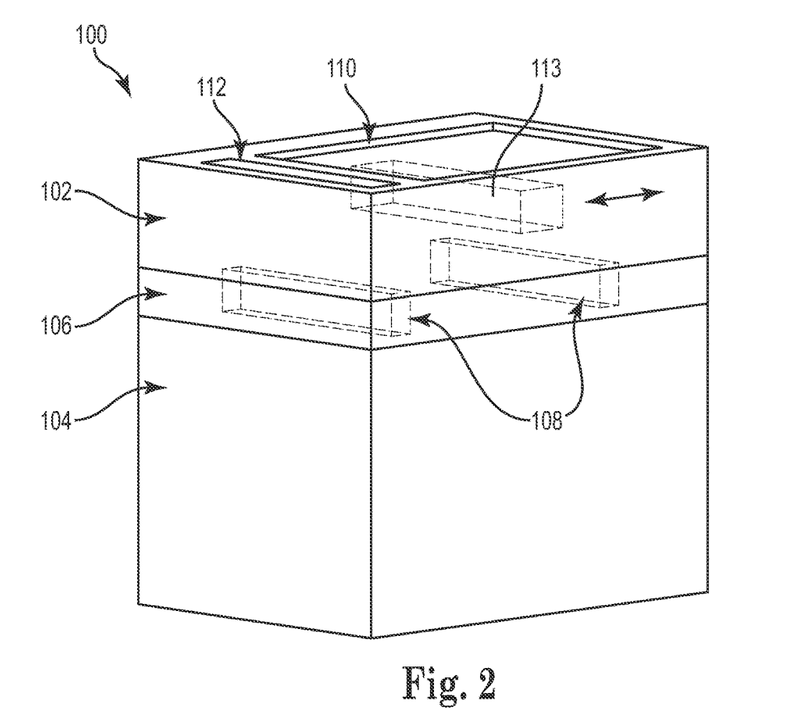
FIG. 2 is a perspective view schematically illustrating an imaging device in an assembled state, according to an embodiment of the present disclosure.

FIG. 2 is a perspective view schematically illustrating an imaging device assembly 100, according to an embodiment of the present disclosure. In one embodiment, assembly 100 comprises at least substantially the same feature and attributes as imaging device 10 of FIG. 1. As shown in FIG. 2, imaging device assembly 100 includes a first imaging module 102 and a second imaging module 104. In one embodiment, the first imaging module 102 comprises a scanner and the second imaging module 104 comprises a printer. In some embodiments, the scanner includes at least a first scan window 110, a second scan window 112, and a mobile scanning engine 113. In one aspect, each of the first and second imaging modules 102, 104 define a container or frame configured to house circuitry for carrying out the intended functions (scanning, printing, copying, etc.) of the particular imaging module. In one embodiment, each imaging module 102, 104 is generally self-contained such that the first imaging module 102 is capable of functioning generally independently of second imaging module 104, even though the two respective modules 102, 104 can function cooperatively when desired.

In other embodiments, the first imaging module 102 comprises an imaging component other than a scanner and/or the second imaging module 104 comprises an imaging component other than a printer.

In some embodiments, imaging device assembly 100 includes a transition portion 106 sandwiched between the first imaging module 102 and the second imaging module 104. In one aspect, the transition portion 106 houses an attachment mechanism (shown in broken lines 108) configured to secure the first imaging module 102 vertically above and relative to the second imaging module 104. In other embodiments, attachment mechanism 108 is configured and positioned to secure the first imaging module 102 relative to the second imaging module 104 when they are not in a vertically stacked relationship, such as in a side-by-side relationship.

Figure 3:
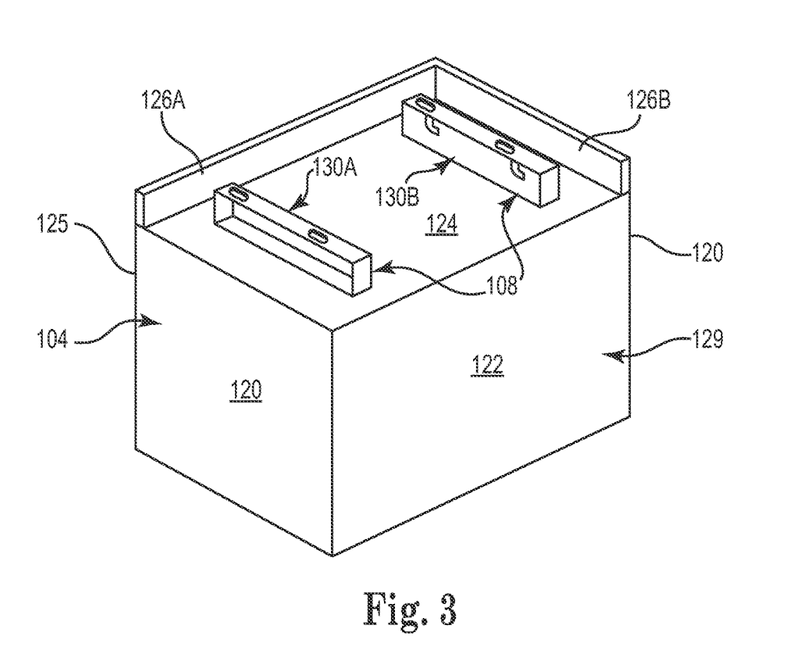
FIG. 3 is a perspective view schematically illustrating one imaging module prior to assembly of an imaging device, according to an embodiment of the present disclosure.

FIG. 3 is a perspective view schematically illustrating second imaging module 104 and a portion of attachment mechanism 108, according to an embodiment of the present disclosure. As shown in FIG. 3, second imaging module 104 includes side portions 120, front portion 122, top portion 124, and back portion 125. In general terms, second imaging module 104 includes a frame or container 129 that houses printing-related structures, circuitry, and components.

In one aspect, a pair of first attachment members 130A, 130B is secured on top portion 124 while extending generally parallel to each other in a spaced apart relationship. In one embodiment, a longitudinal axis of each attachment member 130A, 130B extends from front portion 122 to back portion 125 of second imaging module 104. The attachment members 130A, 130B will be further described later in association with FIG. 6. As further shown in FIG. 3, transition portion 126 includes panels 126A, 126B with two other front and side panels not present for illustrative clarity.

Figure 4:
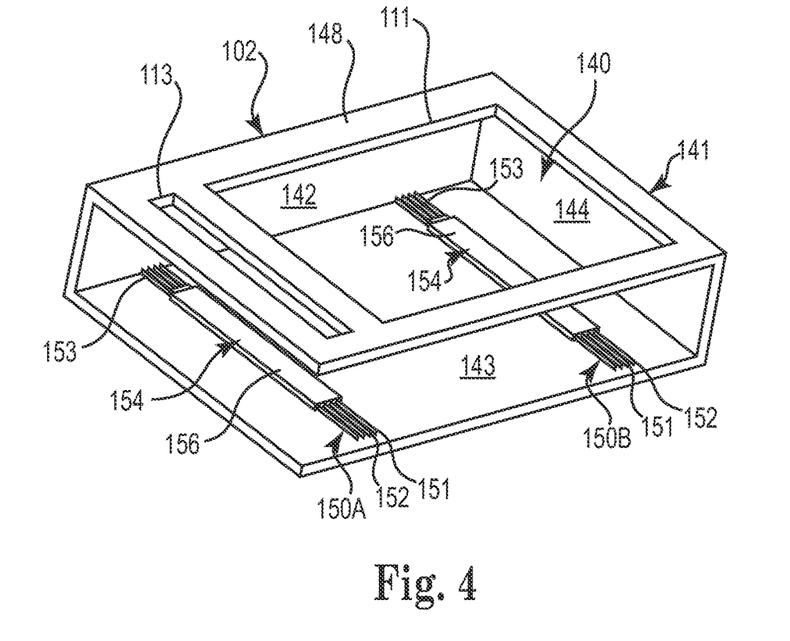
FIG. 4 is a partial perspective view schematically illustrating one imaging module prior to prior to assembly of the imaging device, according to an embodiment of the present disclosure.

FIG. 4 is a perspective view schematically illustrating first imaging module 102, according to an embodiment of the present disclosure. As shown in FIG. 4, first imaging module 102 defines a frame or container 141 defining an interior 140. In general terms, container 141 houses scanning-related structures, circuitry, and components. The container 141 includes a pair of side walls 144, a back wall 142, a bottom portion 146 and a top portion 148. While one side wall and the front wall are removed for illustrative clarity to better show the interior 140 of the container 141, it will be understood that container 141 actually includes a front wall (substantially identical to back wall 142) that is spaced apart from and opposite to back wall 142, while a side wall (substantially identical to side wall 144) is spaced apart from and opposite to side wall 144.

In one embodiment, as shown in FIG. 4, top portion 148 of container 141 defines aperture 111 to mount first scan window 110 (FIG. 2) and defines aperture 113 to mount second scan window 112 (FIG. 2).

In one embodiment, bottom portion 146 includes a pair of elongate reinforcement structures 150A, 150B that raised from interior surface 143 of container 141 with the reinforcement structures 150A, 150B extending generally parallel, and spaced apart, relative to each other. In one aspect, the reinforcement structures 150A, 150B extend from back wall 142 to a front wall (not shown) to be aligned with attachment members 130A, 130B associated with second imaging module 104 shown in FIG. 3. In one embodiment, the reinforcement structures 150A, 150B include an array of ribs 151 defining a top portion of the structures. However, it will be understood that in some embodiments, bottom portion 146 of first imaging module 102 omits reinforcement structures 150A, 150B.

As further shown in FIG. 4, a pair of attachment members 154 are secured relative to bottom portion 146 of first imaging module 102. In embodiments which include reinforcement structures 150A, 150B on bottom portion 146 of container 141, a spine portion 156 of the attachment members 154 is secured directly over the respective structures 150A, 150B. In one aspect, a longitudinal axis of the spine portion 156 of attachment members 154 is aligned with, and generally parallel to, a longitudinal axis of the reinforcement structures 150A, 150B. In addition, in some embodiments, reinforcement structures 150A, 150B are substantially longer than the first attachment members 154 such that end portions 152, 153 of structures 150A, 150B are exposed, as shown in FIG. 4. By providing reinforcement structures 150A, 150B with a length that substantially matches a length of bottom portion 146 between back wall 142 to the front wall (not shown), the reinforcement structures 150A, 150B act to significantly increase the strength of the bottom portion 146 in the region at which first attachment members 154 exert pressure on first imaging module 102.

In one embodiment, during installation of first attachment members 154 the top portion 148 of container 141 is not present such that container 141 defines an open top to allow access to interior 140 of container 141 for installing first attachment members 154. Top portion 148 is secured on container 141 at some point in time after installation of first attachment members 154 and/or of other components of first imaging module 102. In other embodiments, top portion 148 is present during installation of first attachment members 154 and aperture 111 provides access to interior 140 of container 141 for installing first attachment members 154 such that aperture 111 defines an open top for container 141 of first imaging module 102.

Figure 7:
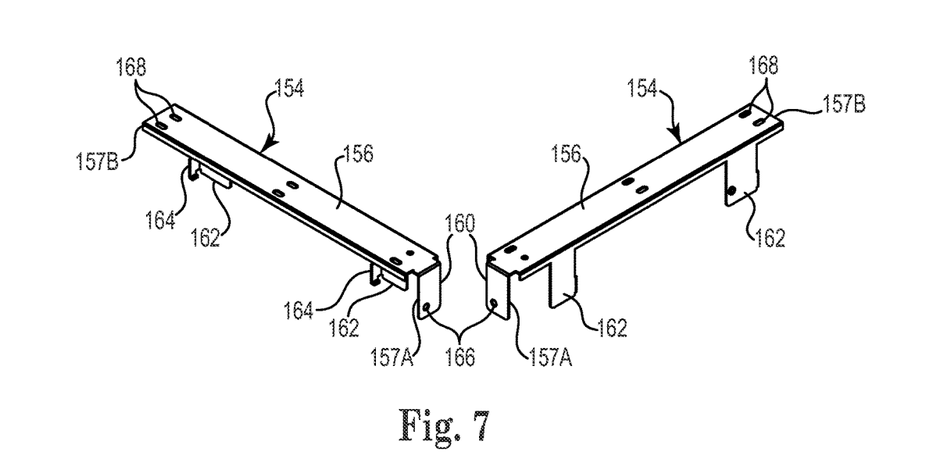
FIG. 7 is a perspective view of a pair of second attachment members, according to an embodiment of the present disclosure.

Further details regarding the structure of the attachment members 154 are illustrated in association with FIG. 7. As shown in FIG. 7, in one embodiment, each attachment member 154 includes a spine portion 156 that extends from a first end 157A to a second end 157B. At first end 157A, attachment member 154 includes a first flange 160 that protrudes outwardly from and extends generally perpendicular to the spine portion 156. In one aspect, first flange 160 defines at least one hole 166, which is configured to receive a fastener for establishing a ground path from the first imaging module 102 to the second imaging module 104, as further described later in association FIG. 10.

In another aspect, attachment member 154 includes at least one second flange 162 that extends outwardly from, and generally perpendicular to, spine portion 156. The second flanges 154 extend in a plane that is generally perpendicular to a plane through which first flange 160 extends. In the embodiment shown in FIG. 7, attachment member 154 includes a pair of second flanges 162 that are spaced apart along a length of the spine portion 156.

In one embodiment, a wing or tab 164 extends from an edge of the second flange 162 and is generally perpendicular to respective flanges 162. The tab 164 is configured to facilitate securing the second flange 162 relative to an attachment member 130A, 130B associated with second imaging module 104, as further described in association with FIGS. 7-9.

Figure 5:
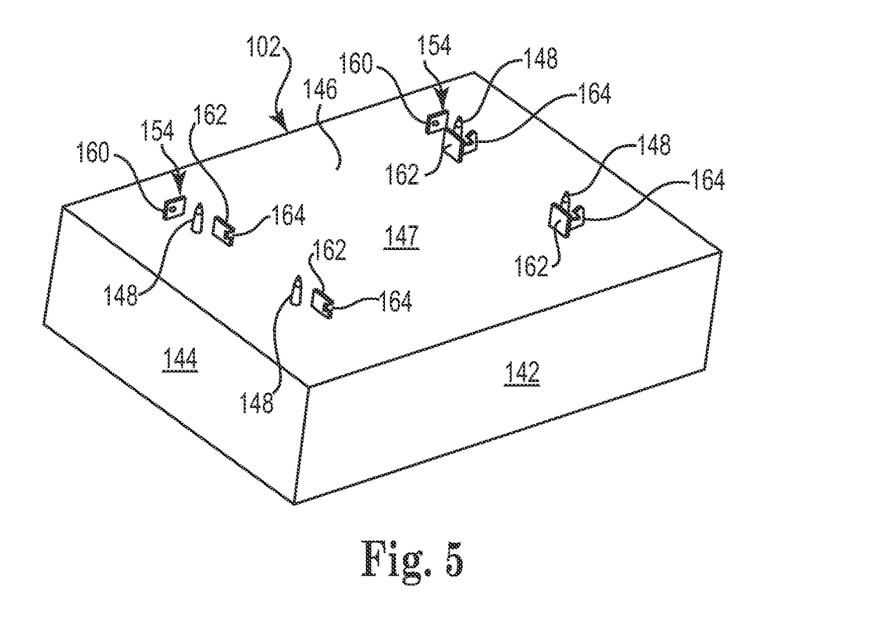
FIG. 5 is a perspective view schematically illustrating a bottom of an imaging module with an attachment member prior to assembly of the imaging device, according to an embodiment of the present disclosure.

In some embodiments, attachment member 154 includes one or more pairs of holes 168 located in spine portion 156 and which are located to receive fasteners to secure the attachment member 154 relative to bottom portion 146 of container 141 (FIGS. 4-5). In one aspect, spine portion 156 overlies reinforcement structures 150A, 150B (FIG. 4) and such fasteners are secured into the respective reinforcement structures 150A, 150B.

In one embodiment, each attachment member 154 is made of an electrically conductive material, such a metal material, while at least the bottom portion 146 of container 141 of first imaging module 102 is made of a non-conductive material, such as a non-metallic material. In some embodiments, attachment member 154 is made of a metal material while the entire container 141 is made of a non-metallic material. In one embodiment, at the least the top portion 124 of container 129 of second imaging module 104 is made of a non-conductive material such as a non-metallic material while in other embodiments, the entire container 129 of second imaging module 104 is made of a non-conductive material, such as a non-metallic material.

FIG. 5 is a perspective view schematically illustrating an exterior surface 147 of bottom portion 146 of container 141 of first imaging module 102, according to an embodiment of the present disclosure. FIG. 5 further illustrates the interaction and relationship between first attachment member 154 and container 141 of first imaging module 102. Furthermore, it will be understood that while FIG. 5 is provided to better visualize these structures, the upside down orientation of first imaging module 102 in FIG. 5 does not represent an orientation of first imaging module 102 during a method of assembly of an imaging device according to embodiments of the present disclosure.

Upon securing first attachment member 154 relative to bottom 146 of container 141 with spine portion 156 of first attachment member 154 located within an interior 140 of container 141 (as shown in FIG. 4), first flange 160 and second flanges 162 of each attachment member 154 protrude through bottom 146 to be exposed and extend outwardly from an exterior surface 147 of bottom portion 146 of container 141, as shown in FIG. 5. In one aspect, both the first and second flanges 160, 162 extend generally perpendicular to the exterior surface 147 of bottom portion 146 of container 141. In another aspect, bottom portion 146 of container 141 defines a pair of pins 148 that extend outwardly from, and generally perpendicular to exterior surface 147 of bottom portion 146. Moreover, each of the respective second flanges 162 is located in close proximity to a respective pin 148. In this configuration, first imaging module 102 is ready to be mounted on or relative to second imaging module 104.

In one embodiment, pins 148 and bottom portion 146 of container 141 are formed via molding as a single, monolithic structure. However, in other embodiments, pins 148 are separate members that are attached to the bottom portion 146 of container 141. In other embodiments, reinforcement structures 150A, 150B are independent elements (e.g. not molded as part of bottom portion 146 of container 141) that are attached to bottom portion 146 within interior 140 of container 140. In these latter embodiments, bottom side of reinforcement structures 150A, 150B defines pins 148 and the bottom portion 146 of container 141 defines holes through which pins 148 protrude to become exposed at exterior surface 147 of bottom portion 146 of container 141.

Figure 6:
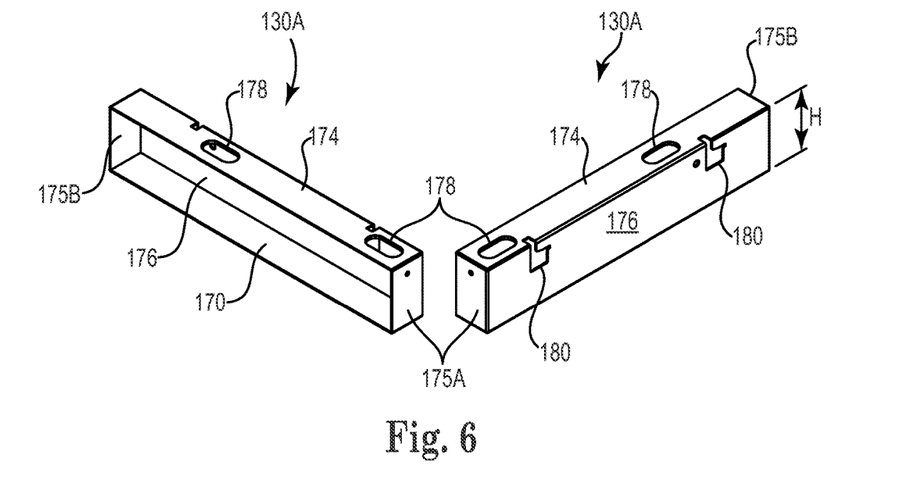
FIG. 6 is a perspective view of a pair of first attachment members, according to an embodiment of the present disclosure.

With first imaging module 102 equipped with first attachment member 154, as shown in FIGS. 4-5, first imaging module 102 is ready to be attached relative to second imaging module 104 via attachment members 130A, 130B of attachment mechanism 108, which are further described and illustrated in association with FIG. 6. In general terms, as shown in FIG. 3, second attachment members 130A, 130B are mounted on top portion 124 of container 139 of second imaging module 104 to form part of attachment mechanism 108 to secure first imaging module 102 on top of second imaging module 104.

With further reference to FIG. 6, in one embodiment each attachment member 130A, 130B defines a generally box-like structure including bottom wall 170, top wall 174, side walls 175A, 175B, and side wall 176. In one aspect, top wall 174 defines at least one hole 178 sized, shaped, and positioned along a length of top wall 174 to receive a reciprocating pin 148, which protrudes from an exterior surface 147 of bottom portion 146 of container 141 as best seen in FIG. 5. In the embodiment shown in FIG. 6, each attachment member 130A, 130B includes a pair of holes 178 spaced apart by the same distance by which pins 148 of first imaging module 102 are spaced apart. In one aspect, holes 178 have a generally elongate shape to allow slidable movement of pin 148 along a length of the holes 178 to allow sliding movement of first attachment member 154 relative to second attachment member 130A, 130B, as will be further described in association with FIG. 8-9. Accordingly, the holes 178 help locate reciprocating pins 148 and help align the first attachment members 154 with the second attachment members 130A, 130B.

In another aspect, side wall 176 and top wall 174 of second attachment members 130A, 130B define at least one hole 180 sized, shaped, and positioned along a length of second attachment members 130A, 130B to slidably receive a reciprocating second flange 162 of attachment member 154 (FIG. 7). In the embodiment shown in FIG. 6, each attachment member 130A, 130B includes a pair of holes 180 spaced apart by the same distance by which second flanges 162 of first attachment member 154 are spaced apart. In one aspect, each hole 180 is sized and shaped to cause releasable locking of second flange 162 (with tab 164) relative to hole 180, and therefore, cause locking of first attachment member 154 relative to second attachment member 130A, 130B.

Figure 8:
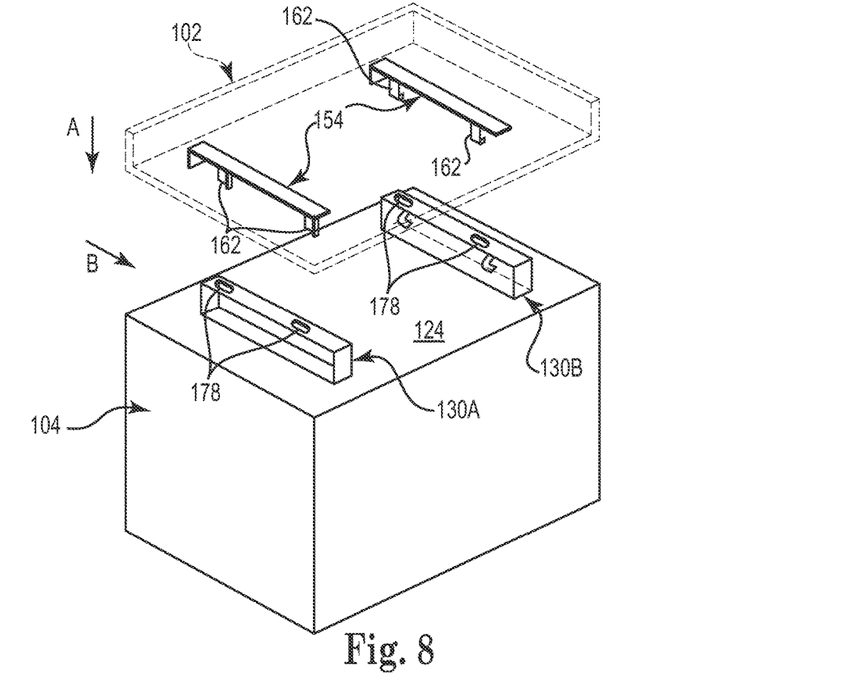
FIG. 8 is a perspective view schematically illustrating attachment of a first imaging module to a second imaging module during assembly of an imaging device, according to an embodiment of the present disclosure.

FIG. 8 is a perspective view schematically illustrating the attachment of first imaging module 102 relative to second imaging module 104, according an embodiment of the present disclosure. As shown in FIG. 8, first imaging module 102 is positioned generally over second imaging module 104 with first attachment members 154 generally aligned with second attachment members 130A, 130B. The first imaging module 102 is moved vertically downward (as represented by directional arrow A) to cause the pins 148 on exterior surface 147 of bottom 146 of container 141 (FIG. 5) to penetrate holes 178 on top of second attachment member 130A, 130B, and so that second flanges 162 of first attachment member 154 releasably engage holes 180 in second attachment members 130A, 130B.

In this arrangement, a plastic-to-metal slidable interface is established between non-metallic bottom portion 146 of container 141 and top wall 174 of metallic second attachment members 130A, 130B. Next, the first imaging module 102 is slidably advanced (as represented by directional arrow B) relative to a stationary second imaging module 104, which in turn causes, second flanges 162 of first attachment members 154 to become further interlocked with holes 180 of second attachment members 130A, 130B. This plastic-to-metal interface substantially reduces friction when the first imaging module 102 is slidably advanced relative to second imaging module 104, as compared to conventional metal-to-metal interfaces.

In another aspect, in this arrangement the bottom portion 146 of container 141 of first imaging module 102 becomes sandwiched between the spine portion 156 of first attachment member 154 and the top wall 174 of the second attachment member 104. The interaction and relationship of the first attachment member 102, bottom portion 146 of first imaging module 102, second attachment member 104, and top portion 124 of second imaging module 104 is further schematically illustrated in FIG. 9.

Figure 9:
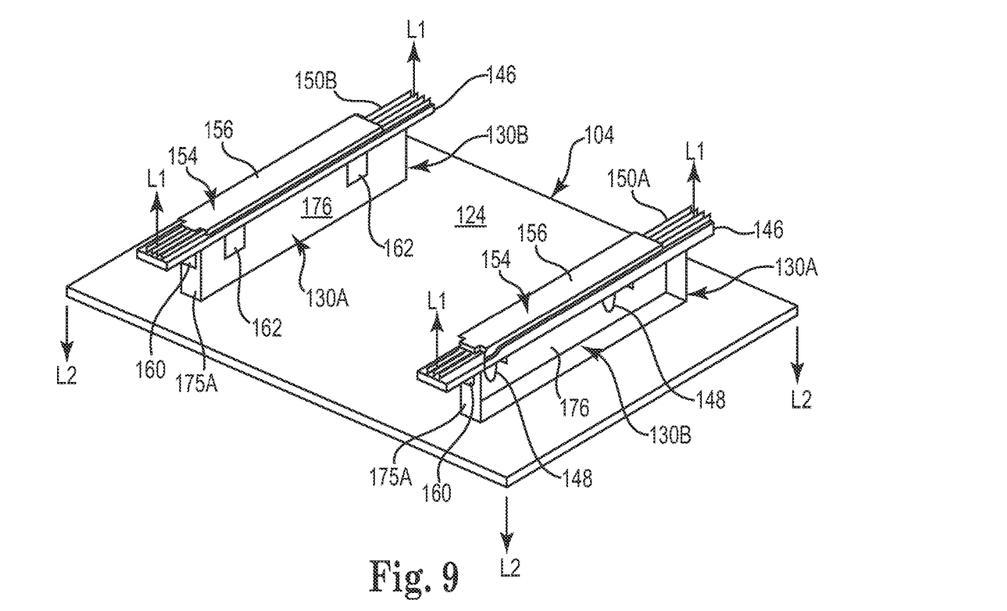
FIG. 9 is a perspective view schematically illustrating interaction of a pair of first attachment members with a pair of second attachment members of an imaging device assembly, according to an embodiment of the present disclosure.

As shown in FIG. 9, when first attachment member 154 is fully engaged relative to second attachment members 130A, 130B, the second flanges 162 of first attachment member 154 engage side wall 176 of second attachment member 130A, and first flange 160 engages end 175A of second attachment members 130A, 130B. Pins 148 of container 141 of first imaging module 102 protrude through top wall 174 of second attachment member 130A, 130B such that pins 148 extend partially within an interior of second attachment member 130A, 130B, as seen in FIG. 9. Finally, bottom portion 146 of container 141 of first imaging module 102 is interposed between spine portion 156 of first attachment member 154 and top wall 174 of second attachment member 130A, 130B.

As further shown in FIG. 9, when a load is applied, such as when a person attempts to lift the imaging device assembly by holding and lifting solely first imaging module 102 without significantly supporting the second imaging module 104 (or without supporting it at all), an upward load L1 is placed on the bottom portion 146 of first imaging module 102 (including the reinforcement structures 150A, 150B) while a downward load L2 (by force of gravity) is exerted on top portion 124 of container 129 of second imaging module 104. Because the spine portion 156 of first attachment member 154 is located above bottom portion 146 (and above reinforcement structures 150A, 150B) of first imaging module 102, the bottom portion 146 is under compression during this load L1 and L2. By locating spine portion 156 of first attachment member 102 within interior 140 of container 141 (at bottom portion 146) of first imaging module 102, first attachment member 102 adds significant strength and stiffness to the bottom portion 146 when assembled together with second attachment member 130A, 130B and second imaging module 104.

The arrangement shown in FIG. 9 reduces long term creep of the bottom portion 146 of first imaging module 102 because tension on bottom portion 146 is generally precluded when loads L1, L2 occur due to lifting of first imaging module 102 (without supporting or lifting second imaging module 104).

Figure 10:
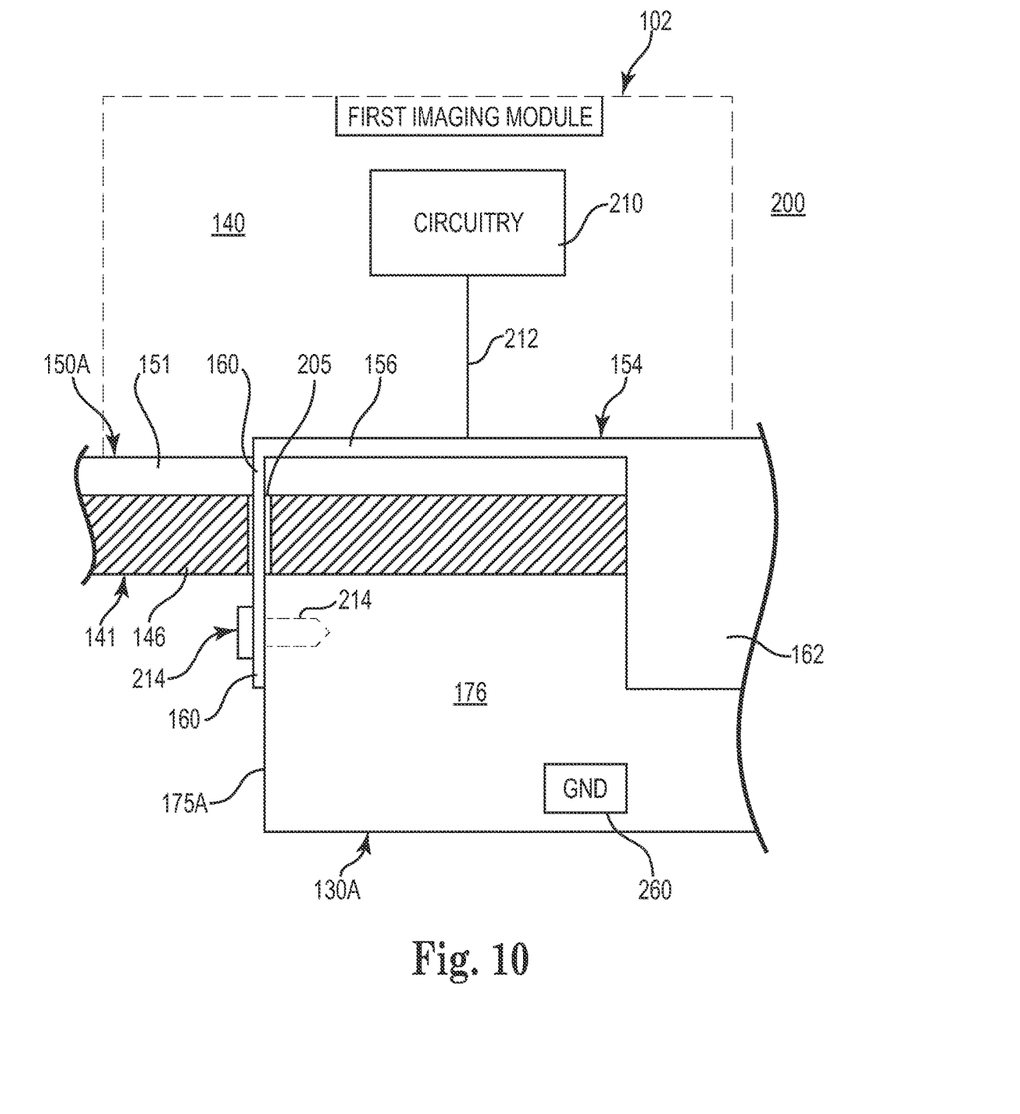
FIG. 10 is a diagram, including a partial sectional view, schematically illustrating a grounding path of an imaging device assembly, according to an embodiment of the present disclosure.

In addition, as schematically illustrated in the diagram 200 shown in FIG. 10, this arrangement also provides a direct grounding path for circuitry and electrical components within first imaging module (schematically represented by dashed lines 102) to the chassis ground of the imaging device assembly, such as a chassis ground of the second imaging module 104. In particular as shown in the partial sectional view of FIG. 10, a grounding path 250 extends from circuitry 210 (via connector 212) and/or other electrical components within an interior 140 of first imaging module 102 to and through spine portion 156 of first attachment member 154, to and through first flange 160, and to and through a metal fastener 214 secured within hole 166 of first flange 160, and to and through end 175A of second attachment member 130A, 130B. It will be understood that second attachment member 130A, 130B is conductively coupled to or comprises a chassis ground 260.

In one aspect, as further shown in FIG. 10, bottom portion 146 of first imaging module 102 defines a slot 205 to enable first flange 160 to protrude through bottom portion 146 to become available for connection to second attachment member 130A, 130B. In another aspect, bottom portion 146 includes additional slots (like slot 205) that are positioned and sized to slidably receive second flanges 162 of first attachment member 154 to enable those flanges 162 to protrude through bottom portion 146 to become exposed exterior to bottom portion 146 of container 141 of first imaging module 102.

Because first attachment member 154 is placed within interior 140 of container 141 of first imaging module 102, first imaging module 102 can remain upright during installation of the first attachment member 154. This arrangement stands in contrast to conventional attachment mechanisms which would otherwise rely on first turning a first imaging module upside down to install the attachment mechanism before flipping the first imaging module back to its generally upright position for future assembly steps.

Accordingly, one embodiment of the present disclosure includes a method of manufacturing an imaging device, such as a multifunction printer or all-in-one imaging device. In one embodiment, the method is performed using the structures and components of imaging device assembly that were previously described in association with FIGS. 1-10. However, in other embodiments, the method can be performed using other devices having appropriate elements.

In one aspect, the method includes providing a scanner comprising an open container that includes a bottom portion defining at least one hole. The bottom wall portion defines an interior surface within the scanner frame and an external surface on an opposite side of the bottom portion. As part of the method, the open scanner container is maintained in a generally upright position while securing a base portion of a first attachment member on the interior surface of the bottom portion and while inserting at least one protrusion of the first attachment member through the at least one hole of the bottom portion of the open scanner container. The method further includes moving the bottom portion of the open scanner container in sliding contact against a second metallic member on a top portion of a printer container while simultaneously releasably connecting the at least one protrusion of the first attachment member relative to the second attachment member to secure the scanner container above and relative to the printer container. In this way, the scanner container becomes securely fastened to the printer container while simultaneously easing the assembly of the imaging device and strengthening the connection between the first and second imaging modules.

In some embodiments, the same method of manufacturing is applied except that the scanner container is replaced with another imaging module container (e.g. fax, copier, etc.) and/or the printer container is replaced with another imaging module container (e.g., fax, copier, etc.).

In other embodiments of the method of manufacturing, the scanner container is replaced with a printer container such that the two containers being joined together perform generally the same function. Of course, this principle can be applied when both containers provide other functions, such as an arrangement in which the top container provides a copy function and the bottom container also provides a copy function.

While FIGS. 1-10 illustrate the assembly of a first and second imaging modules 102, 104, it will be understood that in other embodiments, more than two imaging modules can be secured together using an attachment mechanism like attachment members 154, 130A, 130B (as previously illustrated and described in association with FIG. 1-10).

Embodiments of the present disclosure provide for a more efficient and robust assembly of different imaging modules that form a single imaging device assembly.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this present disclosure be limited only by the claims and the equivalents thereof.

What is claimed is:

1. A multifunction imaging device comprising:
    a first imaging module frame defining a container including a bottom wall, a pair of side walls spaced apart from and opposite to each other, a front wall and a back wall spaced apart from and opposite to each other, wherein the bottom wall extends transversely between the side walls and extends from the front wall to the back wall, and wherein the plurality of walls defines an interior of the container to contain at least circuitry; and
    a second imaging module frame including a top wall portion, a front wall portion, a back wall portion spaced apart from and opposite the front wall portion, and a pair of side wall portions spaced apart from and opposite each other, wherein the top wall portion extends transversely between the side wall portions and extends from the front wall portion to the back wall portion, and wherein the top wall portion of the second imaging module generally faces the bottom wall of the first imaging module frame,
    wherein the first imaging module frame is directly fixed to the second imaging module frame via at least one first attachment member, which includes:
        a base portion positioned within the interior of the container of the first imaging module frame and extending generally against the bottom wall of the first imaging module; and
        at least one protrusion extending from the base portion, within the interior of the first imaging module frame, through the bottom wall of the first imaging module frame to be exposed external to the bottom wall of the first imaging module frame, wherein the at least one protrusion is releasably connected relative to the top wall portion of the second imaging module frame.

2. The multifunction imaging device of claim 1, wherein the first imaging module frame comprises a scanner frame and the second imaging module frame comprises a printer frame.

3. The multifunction imaging device of claim 1, wherein the second imaging module frame includes at least one second attachment member extending upward from the top wall portion of the second imaging module frame, wherein the at least one protrusion of the at least one first attachment member is releasably connected to the at least one second attachment member.

4. The multifunction imaging device of claim 3, wherein both the second imaging module frame and the first imaging module frame are made of an electrically non-conductive material, wherein both the respective at least one first and second attachment members are made of an electrically conductive material, and wherein the bottom wall of the first imaging module frame is sandwiched between at least the base portion of the at least one first attachment member and the at least one second attachment member.

5. The multifunction imaging device of claim 3, wherein a longitudinal axis of the at least one second attachment member is aligned to be generally parallel to a longitudinal axis of the at least one first attachment member with the at least one first attachment member positioned vertically above the at least one second attachment member.

6. The multifunction imaging device of claim 3, wherein the at least one first attachment member comprises a pair of first attachment members that are generally parallel to, and spaced apart from, each other, and the at least one second attachment member comprises a pair of second attachment members that are generally parallel to, and spaced apart from, each other, wherein the pair of first attachment members are located at an intermediate position between the spaced apart side walls of the first imaging module frame.

7. The multifunction imaging device of claim 1, wherein the at least one first attachment member defines an electrical grounding path extending from the circuitry, through the bottom wall of the first imaging module frame, and to an electrical ground point associated with the second imaging module frame.

8. The multifunction imaging device of claim 1, wherein the releasable connection between the at least one first attachment member and the top wall portion of the second imaging module frame includes a slidably releasable connection.

9. The multifunction imaging device of claim 1, wherein the first imaging module frame includes an elongate reinforcement structure positioned within the interior of the container of the first imaging module frame, with the elongate reinforcement structure located between the base portion of the at least one first attachment member and the bottom wall of the first imaging module frame, wherein the elongate reinforcement structure has a length at least substantially the same as a length of the base portion of the at least one first attachment member.

10. The multifunction imaging device of claim 9, wherein the elongate reinforcement structure includes a plurality of ribs defining a top portion of the elongate reinforcement structure.

11. The multifunction imaging device of claim 10, wherein the elongate reinforcement structure comprises a raised portion formed as part of the bottom wall of the first imaging module frame.

12. The multifunction imaging device of claim 1, wherein the bottom wall of the first imaging module frame is sandwiched between the base portion of the at least one first attachment member and the top wall portion of the second imaging module frame.

13. The multifunction imaging device of claim 1, wherein the base portion of the at least one first attachment member comprises an elongate element extending from the front wall to the back wall of the first imaging module frame and having a length that substantially matches a length of the bottom portion that extends from the back wall to the front wall of the first imaging module.

14. The multifunction imaging device of claim 1, wherein the first imaging module frame is directly fixed to the second imaging module frame without any transition frame interposed between the respective first and second imaging module frames.

15. A multifunction imaging device comprising:
a first imaging module including a top wall, a bottom wall opposite the top wall, a pair of side walls spaced apart from and opposite to each other, a front wall and a back wall spaced apart from and opposite to each other, wherein the bottom wall extends transversely between the side walls and extends from the front wall to the back wall, wherein the plurality of walls of the first imaging module define an interior of the first imaging module in which circuitry is located; and
a second imaging module including a top wall portion, a front wall portion, a back wall portion spaced apart from and opposite the front wall portion, and a pair of side wall portions spaced apart from and opposite each other, wherein the top wall portion extends transversely between the side wall portions and extends from the front wall portion to the back wall portion, and wherein the top wall portion of the second imaging module generally faces the bottom wall of the first imaging module,
wherein the first imaging module is directly fixed to the second imaging module via at least one first attachment member, which is located at an intermediate position between the spaced apart side walls of both the respective first and second imaging modules, with the at least one first attachment member including:
    a base portion positioned within the interior of the container of the first imaging module and extending generally against the bottom wall portion; and
    at least one protrusion extending from the base portion, within the interior of the container of the first imaging module, through holes in the bottom wall portion of the first imaging module to be exposed external to the bottom wall of the first imaging module, wherein the at least one protrusion is releasably connected relative to the top surface portion of the second imaging module.

16. The multifunction imaging device of claim 15, comprising:
at least one second attachment member extending upward from the top wall portion of the second imaging module, wherein the at least one protrusion of the at least one first attachment member is releasably connected to the at least one second attachment member, and
wherein the bottom wall of the first imaging module includes an elongate reinforcement structure positioned within the interior of the first imaging module and located underneath the base portion of the at least one first attachment member, wherein the elongate reinforcement structure has a length at least substantially the same as a length of the base portion of the at least one first attachment member, and wherein the length of the elongate reinforcement structure is substantially the same as a length of the bottom wall extending from the front wall to the back wall of the first imaging module.

17. The multifunction imaging device of claim 15, wherein the first imaging module functions independently of the second imaging module.

18. A multifunction imaging device comprising:
a first imaging module frame including a plurality of walls defining a container having an interior to contain at least circuitry, wherein the plurality of walls includes a bottom wall; and
a second imaging module frame including a plurality of walls defining a container having an interior to contain at least circuitry, wherein the plurality of walls includes a top wall portion, which generally faces the bottom wall of the first imaging module frame,
wherein the first imaging module frame is directly connected to the second imaging module via at least one first attachment member, which includes:
    a base portion positioned within the interior of the container of the first imaging module frame and extending generally against the bottom wall of the first imaging module; and
    at least one protrusion extending from the base portion, within the interior of the first imaging module frame, through the bottom wall of the first imaging module frame to be exposed external to the bottom wall of the first imaging module frame, wherein the at least one protrusion is releasably connected relative to the top wall portion of the second imaging module frame.

* * * * *

UNITED STATES PATENT AND TRADEMARK OFFICE
CERTIFICATE OF CORRECTION

PATENT NO. : 9,742,942 B2
APPLICATION NO. : 13/100741
DATED : August 22, 2017
INVENTOR(S) : Paul K. Mui et al.

It is certified that error appears in the above-identified patent and that said Letters Patent is hereby corrected as shown below:

In the Claims

In Column 11, Line 29, in Claim 15, delete "wall portion" and insert -- wall --, therefor.

In Column 11, Line 32, in Claim 15, delete "wall portion" and insert -- wall --, therefor.

Signed and Sealed this
Twentieth Day of February, 2018

Andrei Iancu
*Director of the United States Patent and Trademark Office*